(12) United States Patent
Noguchi et al.

(10) Patent No.: US 6,314,170 B1
(45) Date of Patent: Nov. 6, 2001

(54) MODEM APPARATUS AND DATA COMMUNICATION METHOD

(75) Inventors: Yoshihiro Noguchi, Kawasaki; Genzo Takagi, Ageo, both of (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/262,334

(22) Filed: Mar. 4, 1999

(30) Foreign Application Priority Data

Apr. 1, 1998 (JP) .................................................. 10-088646

(51) Int. Cl.[7] .................................................. H04M 11/00
(52) U.S. Cl. ..................................... 379/93.32; 379/93.31; 379/100.17
(58) Field of Search ............................. 379/93.31, 93.32, 379/93.34, 100.17, 100.14; 358/434, 435, 436, 438, 440

(56) References Cited

U.S. PATENT DOCUMENTS

| 4,910,506 | 3/1990 | Yoshida et al. |
| 5,673,392 | 9/1997 | Nakashima et al. |
| 5,712,977 | 1/1998 | Glad et al. |
| 6,046,825 | * 9/2000 | Yoshida ........................ 358/434 |
| 6,075,620 | * 6/2000 | Yoshida et al. .................. 358/434 |
| 6,122,072 | * 9/2000 | Matsui et al. .................... 358/434 |

FOREIGN PATENT DOCUMENTS 0569177   11/1993  (WO) .

OTHER PUBLICATIONS

ITU–T Recommendation V.34 (02/98), entitled "A Modem Operating At Data Signalling Rates Of Up To 33600 bit/s for Use On The General Switched Telephone Network And On Leased Point–To–Point 2–Wire Telephone–Type Circuits".

* cited by examiner

*Primary Examiner*—Stella Woo
(74) *Attorney, Agent, or Firm*—Greenblum & Bernstein, P.L.C.

(57) ABSTRACT

A modem parameter required for a modem apparatus is stored in a memory for each telephone number of a communication destination in advance based on past communications. At a communication time, a receiver side is notified of an execution of the short protocol by a QTSD signal, and sequentially a QINFO signal that includes the modem parameter is transmitted.

Since the modem parameter is received by the communication destination, the pre-protocols such as exchange of parameter, etc., are shortened so that communication time can be shortened. Moreover, since the transmission of modem parameter is repeated until it is confirmed that the communication destination receives the modem parameter, occurrence of communication errors can be avoided so that the shortened pre-protocols can be surely executed.

5 Claims, 8 Drawing Sheets

MODEM APPARATUS AND DATA COMMUNICATION METHOD

BACKGROUND OF THE INVENTION

1. Field of the Invention

The present invention relates to a modem apparatus for realizing data communications through a communication network such as a dial-up line, a dedicated line, etc. Also, the present invention relates to a data communication method using such a modem apparatus.

2. Description of the Related Art

In recent years, in the field of data communications, V.34 modem (33.6 kbps) has been widely used in accordance with Recommendation of ITU-T. Particularly, in the field of the facsimile apparatus, data communications have been widely carried out along communication standard of T. 30ANEXF (so-called SUPER G3) using V.34 modem. In the case of using V.34 modem in the facsimile apparatus, specified pre-protocols must be carried out until an image signal is transmitted after a line connection between the facsimile apparatuses on sender and receiver sides is established. In the pre-protocols, there are included a protocol for selecting a data communicable modulation mode from modulation modes such as V.34 half-duplex, V.34 full-duplex, and V.17 half-duplex, and a protocol for selecting a training parameter based on a line probing tone transmitted from the sender side. Further, there are included a protocol for transmitting a training signal from the sender side based on the selected training parameter, and a protocol for checking a receiving quality on the receiver side based on the received training signal. Furthermore, there is included a protocol for selecting a suitable modem parameter based on the checked receiving quality.

For example, in a case where image data is transmitted at the maximum communication rate of 33.6 kbps of V.34 modem, image data can be transmitted in approximately three seconds per sheet of paper of size A4. In such a case, however, extra time of about seven seconds is needed to carry out the aforementioned pre-protocols, and much communication time is wasted as compared with image transmission time.

In order to solve the above problem, inventors of the present invention have proposed a technique of reducing time required in the pre-protocols as possible. According to this technique, the modem parameter best suited to perform communications with a specific destination is stored at an actual image transmitting time. Then, the modem parameter stored is used in receiving and transmitting the image from/to the specific destination at the next time so as to shorten the pre-protocols.

However, in the above-proposed technique, communication errors may occur in some cases at the time hen the pre-protocols are shortened and the modem parameter is transmitted to the receiver side. This may be caused by the following reason. More specifically, the modulated transmitting signal is easily influenced by noise (impulse), and it is thereby difficult to detect the transmitting signal on the receiver side.

SUMMARY OF THE INVENTION

An object of the present invention is to provide a modem apparatus, which can surely realize image receiving and transmitting even when pre-protocols are shortened.

The present invention repeatedly transmits an information signal containing at least a modem parameter previously stored for each telephone number of the communication destination until it is confirmed that the communication destination receives the information signal.

Since the modem parameter is received by the communication destination by the above configuration, the pre-protocols such as exchange of parameter, etc., are shortened so that communication time can be shortened. Moreover, since the transmission of modem parameter is repeated until it is confirmed that the communication destination receives the modem parameter, occurrence of communication errors can be avoided so that the shortened pre-protocols can be surely executed.

BRIEF DESCRIPTION OF THE DRAWINGS

Other objects and further features of the present invention will be apparent from the following detailed description when read in conjunction with the accompanying drawing, in which.

DETAILED DESCRIPTION OF THE PREFERRED EMBODIMENTS

Figure 1:
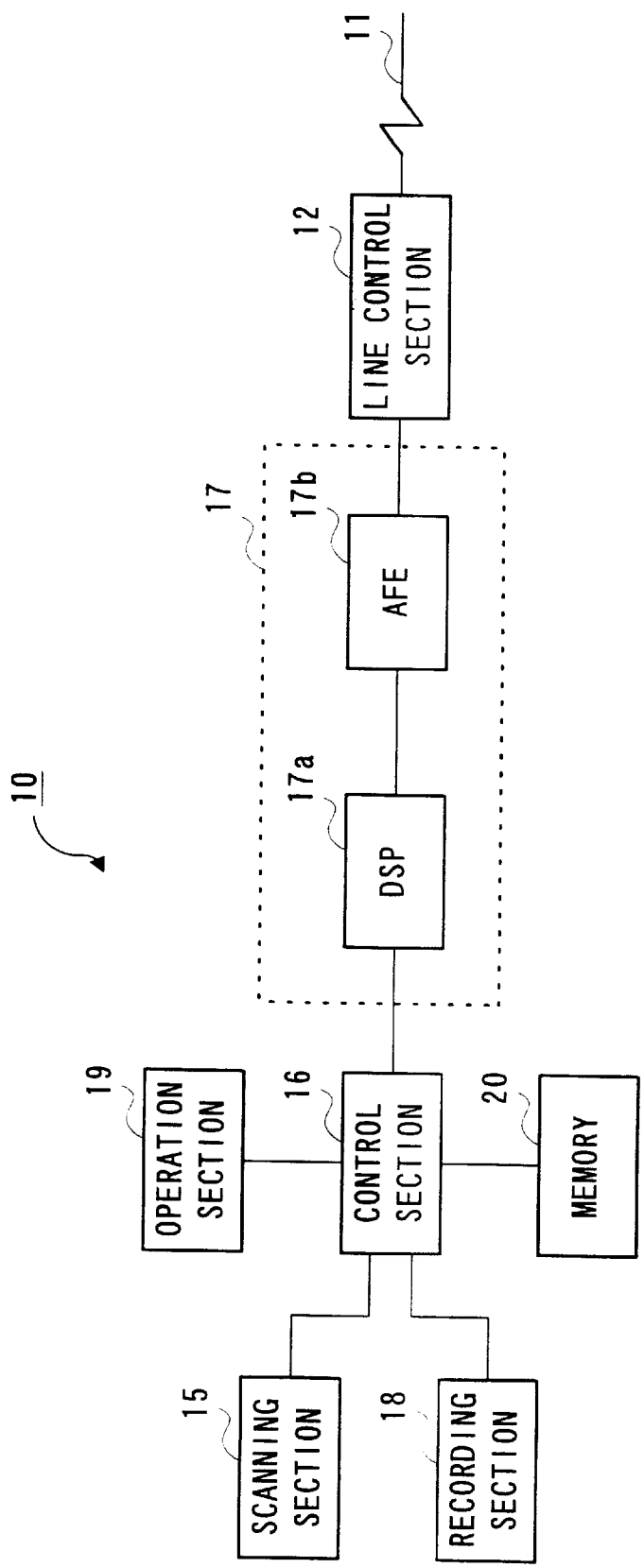
FIG. 1 is a block diagram showing the configuration of a facsimile apparatus to which a modem apparatus according to the present invention is applied.

The modem apparatus of the present invention is configured to repeatedly transmit an information signal including at least a modem parameter stored in advance for each telephone number of a communication destination until it is confirmed that the communication destination has received the information signal.

According to the above-mentioned configuration, since the modem parameter is received by the communication destination, a pre-protocol such as exchange of modem parameter can be simplified so that communication time can be shortened. Moreover, since the transmission of modem parameter is repeated until it is confirmed that the communication destination has received the information signal, occurrence of communication errors can be prevented and the shortened pre-protocol can be surely executed.

The modem apparatus of the present invention is configured to receive an information signal, including at least a modem parameter stored in advance based on past communications, from a communication destination, and transmits a response signal indicating its reception acknowledgment to the communication destination.

According to the above-mentioned configuration, since the communication destination can be notified of the reception of the modem parameter, the communication destination is moved to a next communication protocol after receiving the modem parameter. Therefore, a pre-protocol such as exchange of modem parameter can be simplified so that communication time can be shortened.

The above-mentioned modem apparatus can be applied to a data communication apparatus, for example, a facsimile apparatus.

Such a modem apparatus is preferably V.34 modem complying with Recommendation of ITU-T.

The data communication method of the present invention comprises the steps of:

transmitting a tonal signal, indicating a start of a communication protocol different from a standardized communication protocol, from a sender side;

continuously transmitting a first response signal, indicating acknowledgment of the start of indicated communication protocol, from a receiver side when receiving the tonal signal;

transmitting an information signal, including at least a modem parameter for a telephone number of the receiver side stored in advance, from the sender side when receiving the first response signal; and transmitting a second response signal, indicating a reception acknowledgment of the information signal, in place of said first response signal from the receiver side when receiving the information signal, wherein said sender side repeats transmission of said information signal until receiving the second response signal from said sender side.

According to the above-mentioned method, since the modem parameter is transmitted to the receiver side from the sender side, a pre-protocol such as exchange of modem parameter can be simplified so that communication time can be shortened. Moreover, since the transmission of modem parameter from the sender side is repeated until it is confirmed that the receiver side has received the information signal, occurrence of communication errors can be prevented and the shortened pre-protocol can be surely executed.

In the data communication method of the present invention, there may be provided a step in which the sender side moves to a communication protocol for modem training complying with Recommendation V.34 after repeating the transmission of the information signal predetermined times. When the receiver side receives no information signal, the sender side, which receives the first response signal when transmitting a protocol sync signal PPh complying with Recommendation V.34, preferably returns to the step of transmitting the information signal, again.

According to the above-mentioned method, the transmission of modem parameter from the sender side is repeated until it is confirmed that the receiver side has received the modem parameter.

In the data communication method, there may be provided a step in which the receiver side moves to the communication protocol for modem training when detecting the end of the transmission of the information signal.

According to the above-mentioned method, even if the sender side receives no second response signal, the sender side moves to the communication protocol for modem training after repeating the transmission of the information signal predetermined times. The receiver can move to the communication protocol for modem training in accordance with the sender side. As a result, the communication protocol for modem training can be surely executed.

In the data communication method, there is provided a step in which the receiver side moves to the communication protocol for modem training after the second response signal is transmitted and a predetermined period of time passes, wherein the receiver side transmits the first response signal again after the end of the communication protocol for modem training when the receiver side performs no detection of the end of the transmission of the information signal.

According to the above-mentioned method, the sender side, which receives the first response signal when transmitting a protocol sync signal PPh, returns to the step of transmitting the information signal, again. Therefore, even when the receiver side performs no detection of the end of the transmission of said information signal, the communication protocol for modem training can be surely executed.

In the above-mentioned data communication method, the receiver side transmits the first response signal again when no normal end of the communication protocol for modem training is performed. As a result, the communication protocol for modem training can be surely executed.

An embodiment of the present invention will now be specifically described with reference to the accompanying drawings. FIG. 1 is a block diagram showing the configuration of a facsimile apparatus to which a modem apparatus according to the present invention is applied. A facsimile apparatus 10 comprises a network control section 12 for executing connection/disconnection with a communication network 11 such as a dial-up line, a dedicated line, etc. The network control section 12 controls a dialing and a calling relevant to the communication network 11.

At the time of transmitting an original, an original image is scanned by a scanning section 15. The scanning section 15 may be composed of, for example, a scanner for optically scanning the original image. An image signal of the scanned original image is coded to image data by a control section 16. The obtained image data is sent to the communication network 11 through a modem apparatus 17 according to the present invention. At the time of receiving the original, the sent image data is received from the communication network 11 through the modem apparatus 17. The received image data is decoded by the control section 16, thereafter being recorded in a recording section 18. The recorded image data is output as a copy document by a printer, etc. The modem apparatus 17 realizes modulation and demodulation in accordance with the facsimile communication protocol, which is specified by T. 30ANXF of the ITU-T. At the time of transmitting the original, image data processed by a digital signal processing section (DSP) 17A is converted to an analog signal by an analog front end section 17b, and transmitted to the communication network 11. At the time of receiving the original, image data converted to a digital signal by AFE 17b is processed by DSP 17a, thereafter being captured by the control section 16.

An operation section 19 is provided with input operation keys such as dial keys, start keys, etc., and a display unit such as a liquid crystal display for displaying arbitrary information. In a memory 20, information is stored in accordance with a communication destination having a function for short protocol facsimile communications to be described later. In this embodiment, a telephone number and a modem parameter for each communication destination are stored. A modem parameter includes a power reduction value indicative of signal power and a time value indicative of a training time, and carrier frequency selection for selectively setting either a high level or a low level. The modem parameter also includes preemphasis filter selection, symbol rate selection for selectively setting five levels of rates that are transmitted for an eye pattern, selection of a training constellation point, and a shoulder gain for data demodulation.

Figure 2:
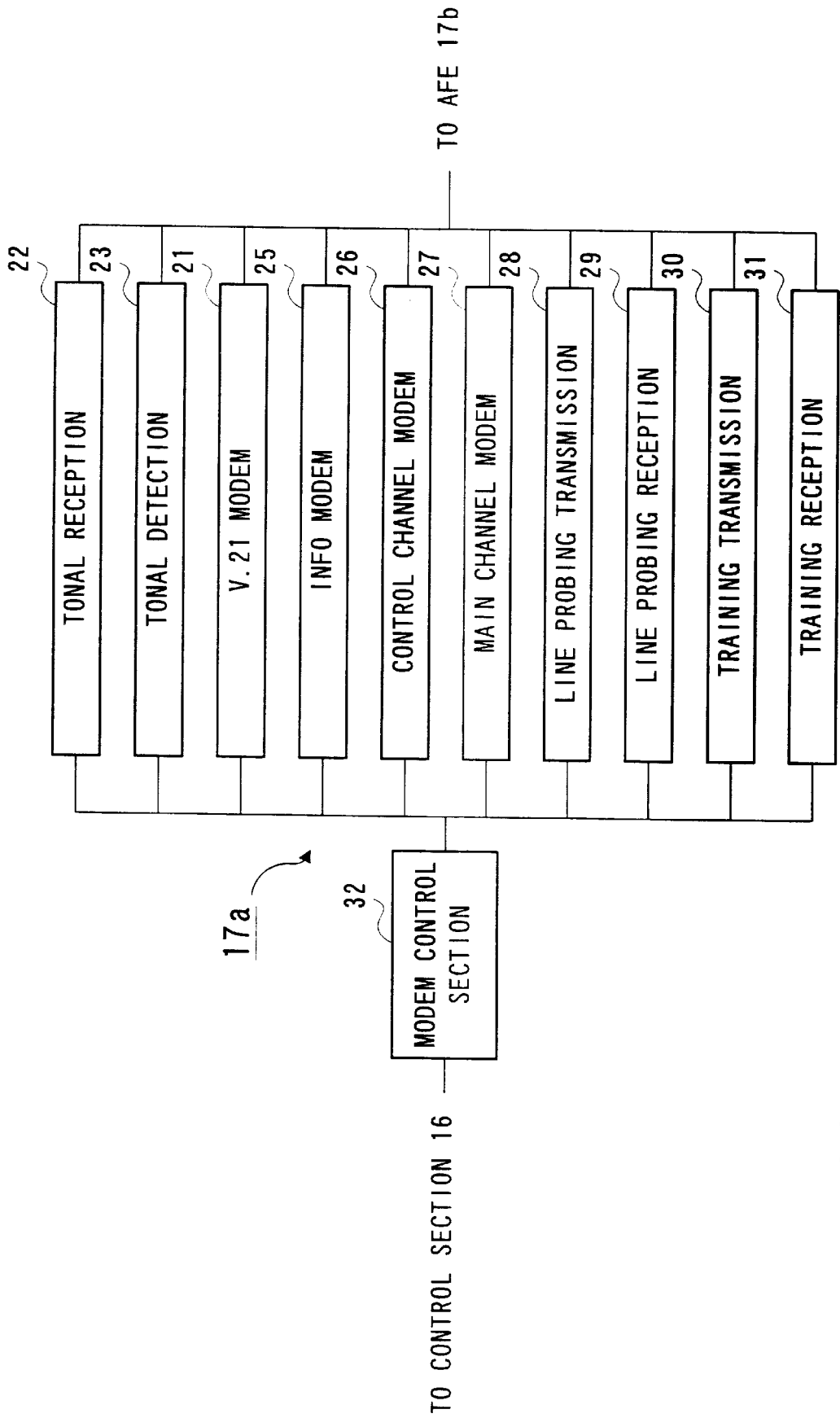
FIG. 2 is a block diagram schematically showing the configuration of a digital signal processing section of the modem apparatus.

FIG. 2 is a block diagram schematically showing the configuration of DSP 17a applied to the modem 17. The DSP 17a comprises a V.21 modem (300 bps, full duplex) 21 which is used in the communication protocol, which is specified by Recommendation V.21 of the ITU-T. A tonal transmission section 22 can sent various tonal signals in accordance with communication protocols. A tonal detection section identifies a tonal signal sent from a communication destination.

DSP 17a also comprises an INFO modem (600 bps, full duplex) 25 which performs communications of INFO sequence, which is specified by Recommendation V.34, a control channel modem (1200 bps, full duplex) 26, which is specified by Recommendation V.34, and a main channel modem (2400 bps to 33.6 kbps, half duplex) 27, which is specified by Recommendation V.34. The INFO modem 25 is used in a start procedure in the communication protocol for line probing to be described later and a short protocol facsimile communication. The main channel modem 27 is used in communicating image data, and the control channel modem 26 is used in a communication protocol for selecting a modem parameter for a main channel modem 27 and in a communication protocol for a facsimile control signal.

A line probing transmission section 28 transmits a line probing tone, which is specified by Recommendation V.34. The line probing tone is formed by combining 21 kinds of tonal signals of 150 Hz to 3750 Hz. A line probing reception section 29 receives the line probing tones sent from a communication destination, and executes a line inspection. In the line inspection, the line probing reception section 29 performs spectrum analysis on the received signals using the fast Fourier transform algorithm to select the optimal symbol rate and carrier frequency for the main channel modem 27 and select other modem parameters.

A training transmission section 30 transmits training signals based on the modem parameter selected by the result of the line inspection. A training reception section 31 learns a filter coefficient of an adaptive equalizer to correct a line characteristic and inspects reception quality based on the training signals received from a communication destination.

The modem function of DSP 17a is controlled by a modem control section 32. The modem control section 32 can control interface with the modem apparatus 17 and the control section 16.

Here, it is assumed that the facsimile apparatus 10 according to the present invention is used on a transmitter side. When an original is placed on a document plate of the facsimile apparatus 10 and the telephone number of a receiver side and a transmission start instruction are input from the operation section 19, the line control section 12 performs a call. At the time of calling, the line control section 12 checks whether or not a short protocol for the input telephone number is registered in memory 20. If registration is not made, a dial call is executed.

Figure 3:
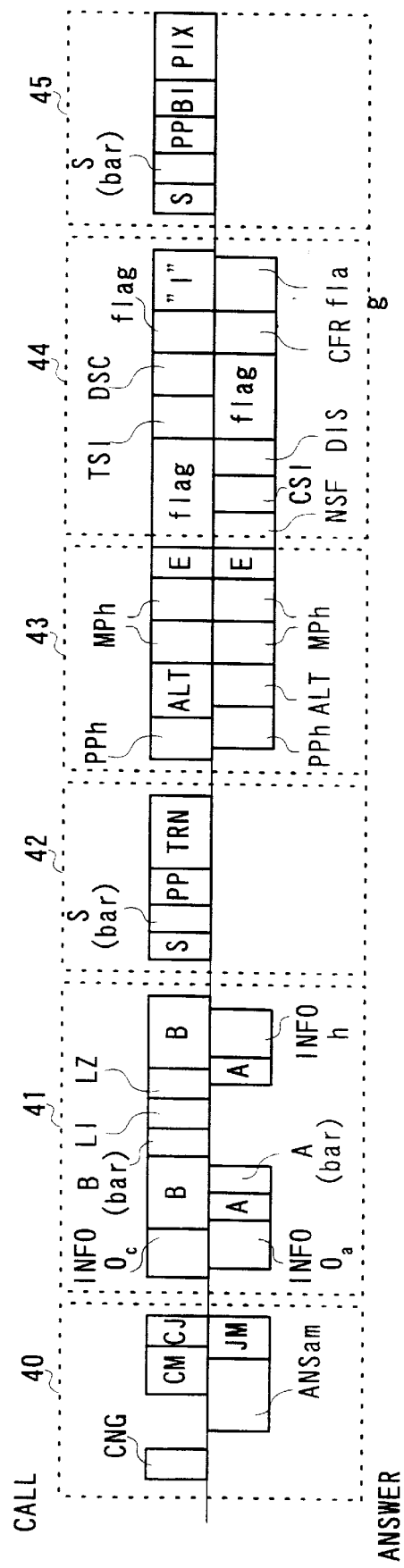
FIG. 3 is a communication sequence view showing general facsimile communications in accordance with Recommendation V.34.

When a line connection is established by the call, a communication protocol 40 for selecting a modulation mode is carried out as shown in FIG. 3. In the communication protocol 40 for selecting a modulation mode , first of all, a sender side transmits a caller number identification signal CNG, and a receiver side transmits a modified answer tone ANSam. Thereafter, the sender side transmits a call menu signal CM indicative of the functions of the sender modem, such as the modulation mode and communication protocol. The call menu signal is formed of a tonal pattern having a start bit "0" of one bit, data 8 bits, and a stop bit "1".

The receiver side transmits a joint menu signal JM indicative of a common communication capability to the sender side based on the contents of the received signal CM. When receiving the JM signal, the sender side transmits a CJ signal, indicating an end of the communication protocol 40 for selecting a modulation mode, to the receiver side. When it is confirmed that the common communication capability does not support V.34 Recommendation based on the JM signal, the reception and transmission of the image signal is performed using V.21 modem. Since the above-mentioned communication protocol using V.21 modem is known, the detailed explanation here will be omitted. The signals CM, JM and CJ are communicated through the V.21 modem, which are provided as standard in the sender and receiver sides.

On the other hand, in the communication protocol 40 for selecting a modulation mode, V.34 modem is selected as a modulation mode, a facsimile communication is selected as a communication protocol, and a communication protocol 41 for a line probing is started.

In the communication protocol 41 for a line probing, the sender transmits INFO0c indicating a communication capability, such as the preset modulation rate and carrier frequency for the V.34 modem, and line probing tones L1 and L2. The receiver side transmits INFO0a indicating the preset communication capability, and receives the line probing tones L1 and L2. As a result of the reception, the receiver side selects modem parameters such as the optimal symbol rate, and a carrier, etc., by spectrum analysis.

The receiver side selects a communicable training parameter based an the thus selected modem parameter and the contents of INFO0c and INFO0a. The selected training parameter is transmitted to the sender side by INFOh signal.

The aforementioned INFO0c, INFO0a and INFOh are communicated through the INFO modems 25 on sender and receiver sides. In this communication protocol 41, as response signals for accomplishing synchronization, there are used a tone B signal and a B (bar) signal (a phase shift signal of 180 degrees to the tone B signal), which is sent from the sender side, and a tone A signal and an A (bar) signal (a phase shift signal of 180 degrees to the tone A signal), which is sent from the receiver side.

When the training parameter is set, a communication protocol 42 for modem training is started. The sender side transmits training signals S, S (bar), PP and TRN in accordance with the training parameter specified by an INFOh signal. The receiver side receives the training signals and learns the filter coefficient of the adaptive equalizer and computes t he optimal training time and noise power ratio SN.

When the communication protocol 42 for modem training is ended, a communication protocol 43 for setting a modem parameter is started. In the communication protocol 43 for setting a modem parameter, the sender and receiver sides transmit protocol sync signals PPh and ALT and a modem parameter MPh each other.

In the modem parameter signal MPh transmitted from the sender side, a preset modem parameter is set. While, in the modem parameter signal MPh transmitted from the receiver side, a modem parameter selected based on the aforementioned line inspection and the SN ratio is set. When receiving the modem parameter signals MPh sent from the communication destination, the sender and receiver sides transmit a reception acknowledgment signal E. The exchange of the modem parameter signals MPh is carried out by the control channel modem 26.

When the sender and receiver sides confirm the reception acknowledgment signal E each other, a communication protocol 44 for a facsimile control signal is started. In the communication protocol 44 for a facsimile control signal, anon-standard protocol signal NSF, a called station identification signal CSI, and a digital identification signal DIS are transmitted from the receiver side. In the non-standard protocol signal NSF, the optimal training time is set. When receiving these signals, the sender side transmits a transmitter identification signal TSI and a digital command signal DCS. When receiving these signals, the receiver side transmits a reception preparation acknowledgment CFR. The communication protocol for the above facsimile control signal is executed using the control channel modem 26.

Sequentially, a communication protocol 45 for image data is started through the main channel modem 27. In the communication protocol 45 for image data, communication is implemented based on the training parameter of the INFOh signal and the modem parameter signal MPh by using a modem parameter which satisfies both the sender and receiver sides.

The sender side transmits protocol sync signals S, S (bar), PP and B1, and then transmits image data PIX. In the receiver side, image data is received after compensating line distortion to utmost limit by using of the learned filter coefficient. Thus, normal facsimile communication is carried out based on Recommendation of the T.30 ANEXF of the ITU-T.

Figure 4:
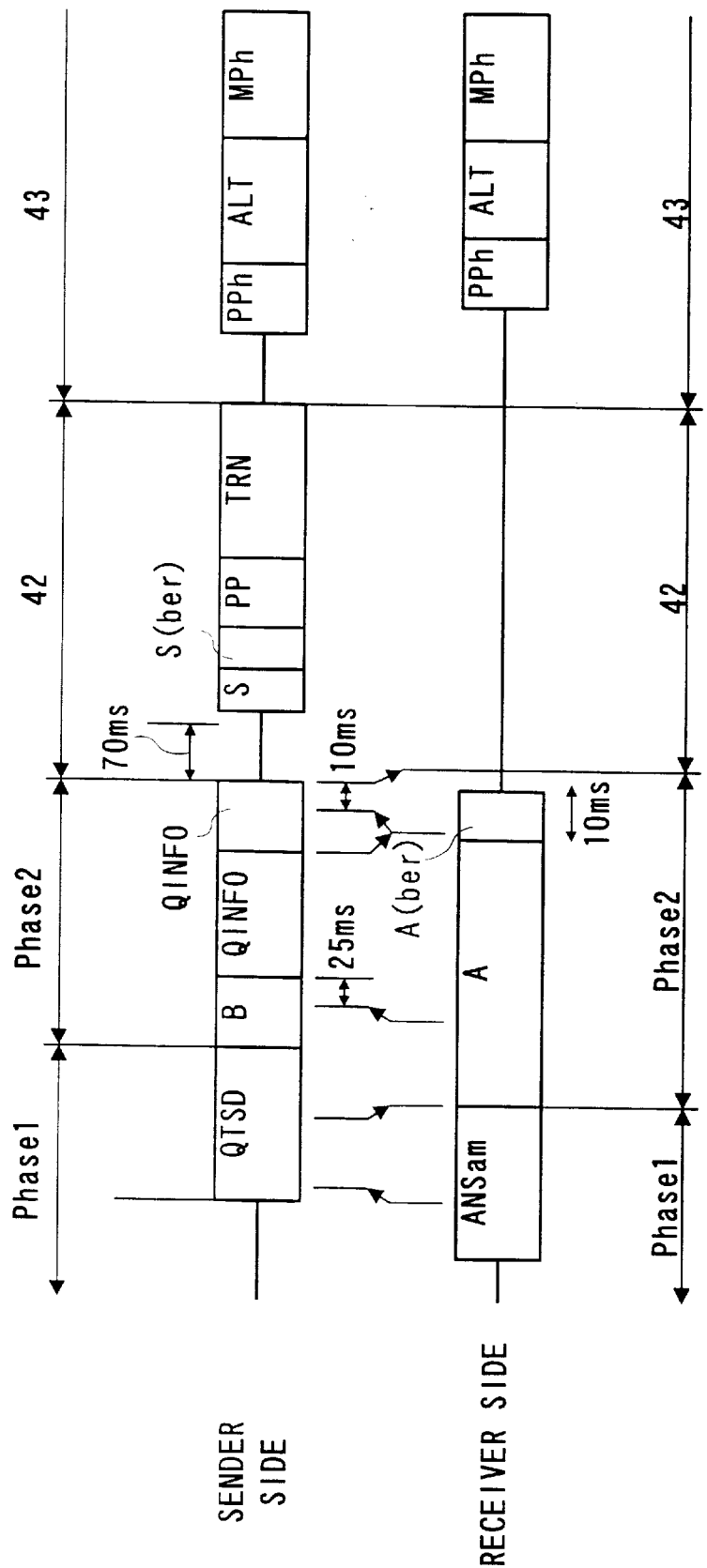
FIG. 4 is a communication sequence view showing a part of a pre-protocol of short protocol facsimile communications.

The following will describe a case in which a short protocol for input telephone number is registered in the memory 20 at the time of the aforementioned call. In this case, the line connection is established and a caller number identification signal CNG and a called station identification signal CSI are communicated. Thereafter, a sender side transmits a quick tonal signal QTSD as shown in FIG. 4. The quick tonal signal QTSD triggers a transition to short protocol facsimile communication.

The quick tonal signal QTSD is formed to have a repetition pattern of "00110011 . . ." The formation of such a tonal signal pattern can be clearly distinguished from a signal pattern "011110" of a flag sequence defined by Recommendation of T.30 and a tonal pattern of the above-mentioned CM signal on the receiver side. Moreover, since the CM signal and the quick tonal signal QTSD are modulated based on the same system, whether the normal facsimile communication or the short protocol facsimile communication should be used can be easily determined by the same sequence.

The receiver side receives the quick tonal signal QTSD, and then transmits a tone A signal. The sender side receives the tone A signal, and then transmits a tone B signal of 25 ms. Thereafter, the sender side transmits a QINFO signal including at least a modem parameter. The receiver side receives the QINFO signal, and then returns the A (bar) signal as a reception acknowledge. The receiver continues transmitting the tone A signal until transmitting the A (bar) signal.

The sender side repeatedly transmits the QINFO signal arbitrary times until receiving the A (bar) signal from the receiver side. By thus transmitting the QINFO signal plurality of times, information such as a modem parameter, etc., can be surely transmitted to the receiver side. In this embodiment, the QINFO signal is transmitted twenty times at the maximum. In the aforementioned communication protocol, the INFO modem 25 is used.

The sender side, which has detected the A (bar) signal, moves to the communication protocol for modem training after silence of 70 ms. In this communication protocol 42 for modem training, communications are performed based on the training parameter INFOh included in the QINFO signal and the optimal training time.

Thereafter, in the communication protocol 43 for setting a modem parameter, the filter coefficient contained in the QINFO signal and the SN ratio are referred when the receiver side sets the modem parameter signal MPh. After that, image data is finally sent to the receiver side by the communication protocol similar to the aforementioned normal facsimile communication. The use of the above-mentioned short protocol facsimile communication can shorten the pre-protocol prior to the transmission of image data, and omit waste of the total communication time as much as possible so as to realize rapid image data communication.

In order to execute the aforementioned short protocol facsimile communication, information such as the telephone number of the communication destination and the optimal modem parameter, etc. , must be registered in the memory 20 in advance. Such a registration can be realized during the facsimile communication similar to the aforementioned normal facsimile communication.

Namely, at the time of executing a communication protocol 44 for a facsimile control signal, a function mount flag, which indicates that a short protocol facsimile communication function is provided, is set in the non-standard protocol signal NSF, which is to be transmitted from the receiver side. The sender side, which has received the function mount flag, determines that the facsimile apparatus on the receiver side has the short protocol facsimile communication function, and a short protocol registration flag is set.

When the short protocol registration flag is set, information, such as a telephone number of the communication destination and a modem parameter, peculiar to the receiver side during communications is stored in the memory 20. If the short protocol facsimile communication function is provided in the facsimile apparatus of the communication destination, information such as a modem parameter is registered in the memory 20 by one image data communication every telephone number. As a result, short protocol facsimile communication can be carried out in image data communication from the next time.

Figure 5:
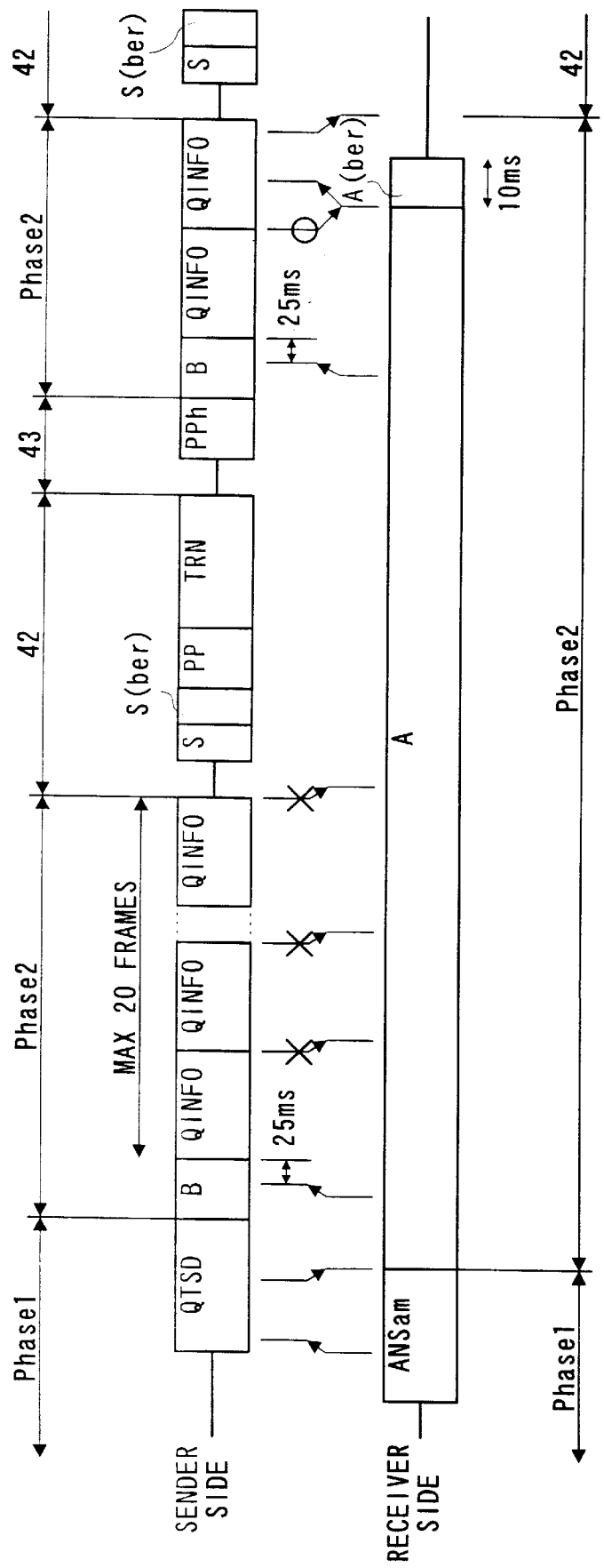
FIG. 5 is a communication sequence view showing pre-protocol of short protocol facsimile communications when a receiver side cannot receive a QINFO signal.

As shown in FIG. 5, it is assumed that the receiver side cannot receive a QINFO signal even though the QINFO signal is transmitted from the sender side twenty times at the maximum. At this time, the sender side ends the transmission of QINFO signal and moves to the communication protocol 42 for modem training after silence of 70 ms. The tone A signal is continued to be transmitted from the receiver side.

Sequentially, the sender side, which has finished the communication protocol 42 for modem training one-sidedly, moves to the communication protocol 43 for setting a modem parameter. Here, the sender side receives the tone A signal continued to be transmitted from the receiver side. When receiving the tone A signal, the sender side executes communication protocol phase 2 from the transmission of tone B signal again. If the sender side receives A (bar) by the re-execution, the sender side determines that the receiver side has received QINFO signal without fail, and executes the communication protocol similar to the normal facsimile communication. The communication protocol is thus repeated until the receiver side receives the QINFO signal, thereby making it possible to transmit the QINFO signal to the receiver side without fail.

Figure 6:
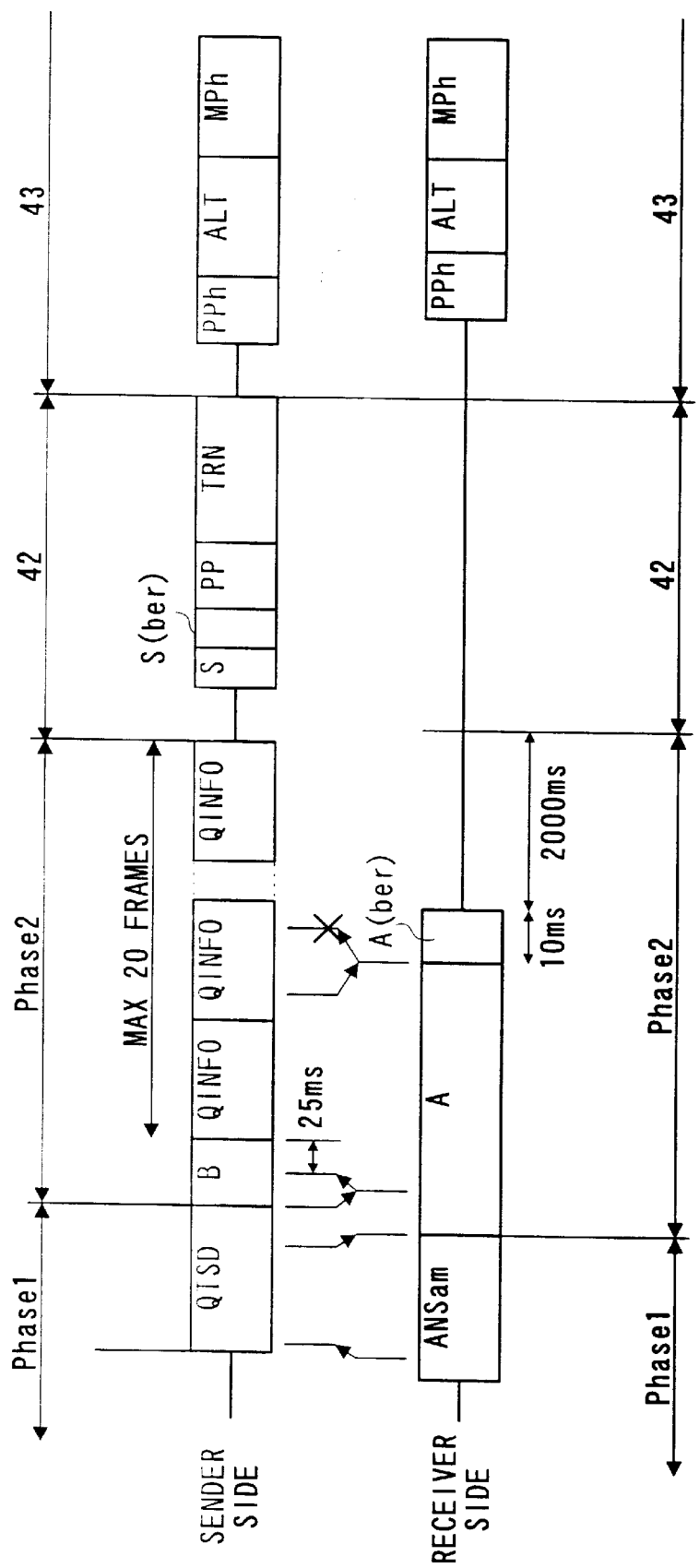
FIG. 6 is a communication sequence view showing the pre-protocol of short protocol facsimile communications when a sender side cannot receive A (bar) signal.

Further, as shown in FIG. 6, it is assumed that the A (bar) signal cannot be received by the sender side even though the QINFO signal reaches the receiver side. At this time, the receiver side detects a carrier-off signal after transmitting the A (bar) signal.

When detecting the carrier-off signal, the receiver side moves to the communication protocol 42 for modem training. If the receiver side can not detect the carrier-off signal for a predetermined period of time (2000 ms in this case), the receiver side moves to the communication protocol 42 after passing a predetermined period of time.

While, the sender side ends the transmission of QINFO signal, and moves to the communication protocol 42 for modem training after silence of 70 ms. Therefore, the communication protocol 42 for modem training is well carried out without receiving the A (bar) signal. Even if the sender side moves to the communication protocol 43 for setting a modem parameter, the communication protocol 43 for setting a modem parameter is surely performed without receiving the tone A signal.

Figure 7:
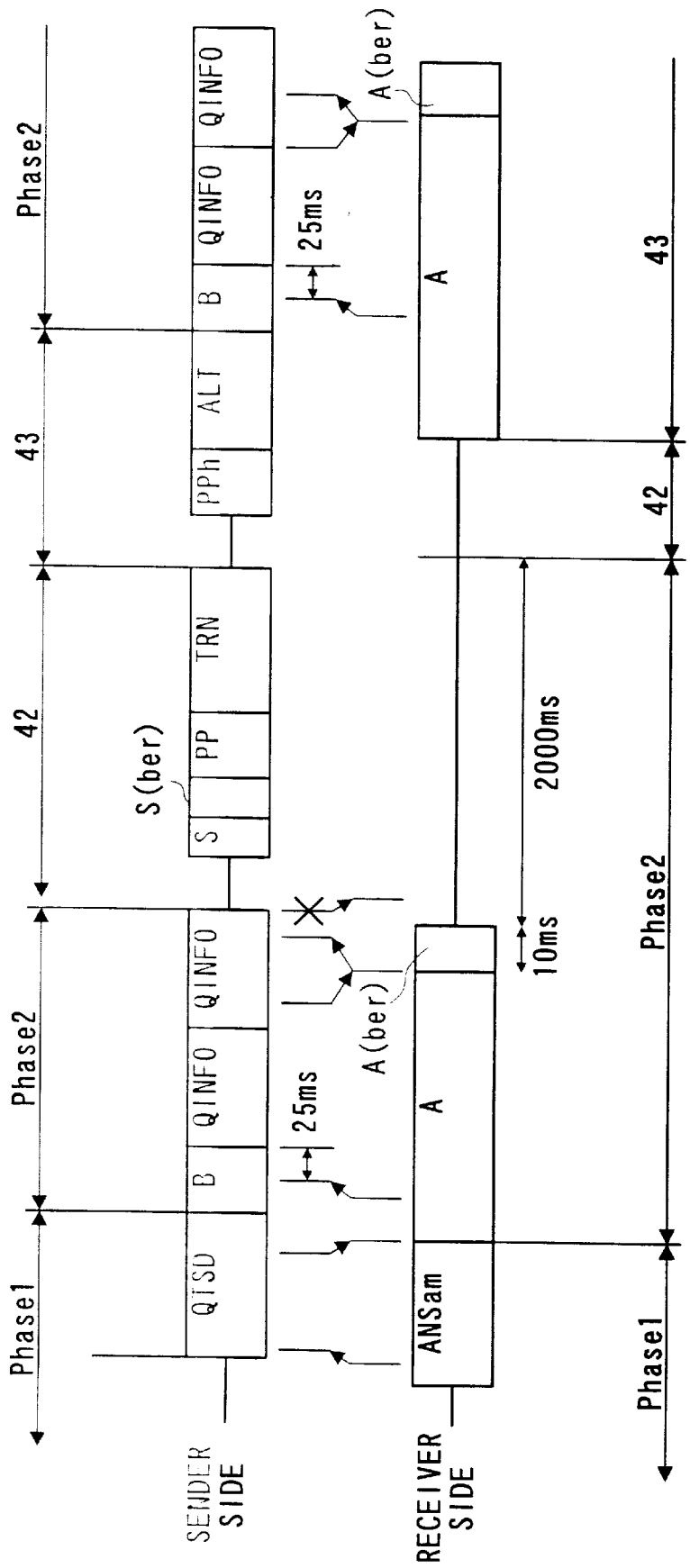
FIG. 7 is a communication sequence view showing the pre-protocol of short protocol facsimile communications when the receiver side cannot detect a carrier stop of the INFO signal.

Moreover, as shown in FIG. 7, it is assumed that the receiver side cannot detect a carrier stop of the QINFO signal. At this time, the sender side, which has finished the transmission of the QINOF signal, moves to the communication protocol 42 for modem training after silence of 70 ms. On the other hand, since the receiver side cannot detect the carrier stop of the QINFO signal, the receiver side cannot go to the communication protocol 42 for modem training. As a result, there is possibility that the communication protocol 42 for modem training will not be normally executed.

However, in this case, the receiver side transmits the A (bar) signal, and then moves to the communication protocol 42 for modem training after passing 2000 ms. Thereafter, when the receiver side moves to the communication protocol 43 for setting a modem parameter, the receiver side transmits the tone A signal again. As a result, the sender side, which has received the tone A signal during the communication protocol 43 for setting a parameter, performs communication protocol phase 2 from the transmission of tone B signal again. This makes it possible to normally execute the communication protocol 42 for modem training.

Figure 8:
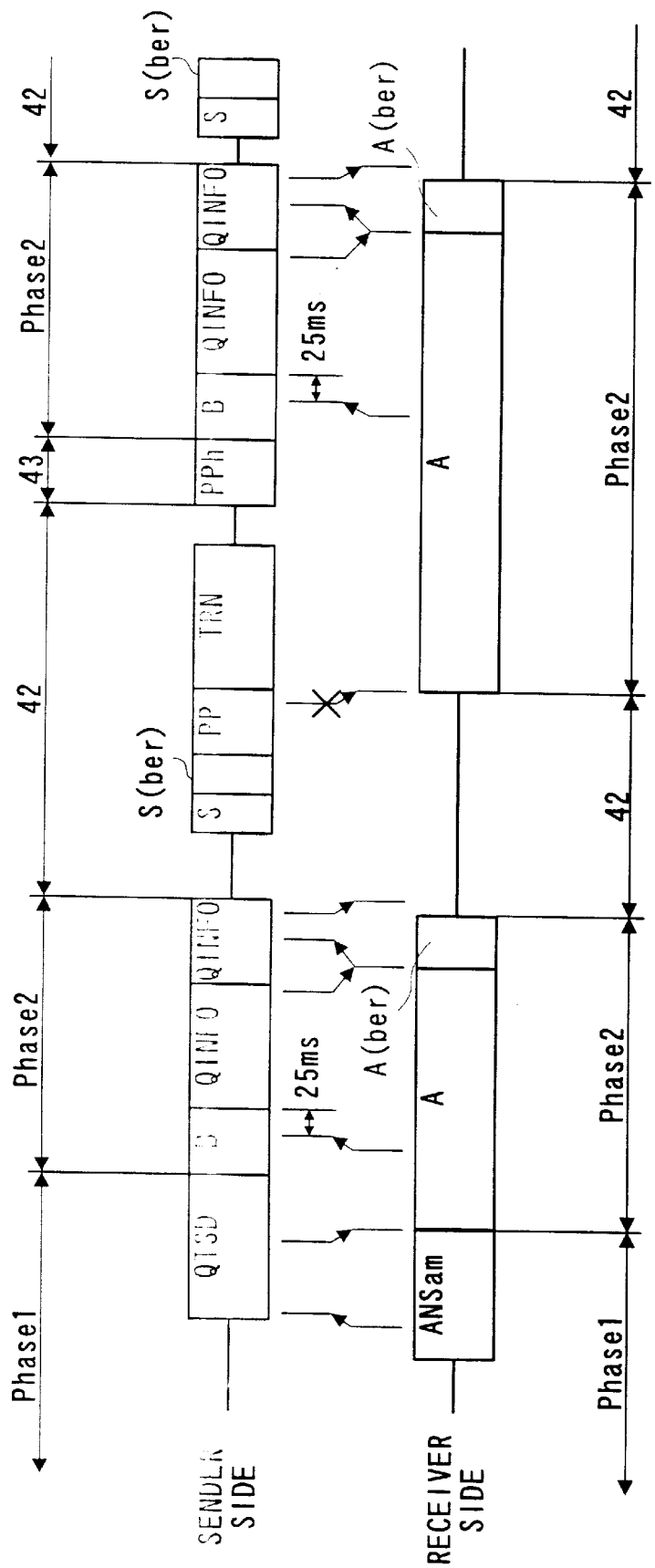
FIG. 8 is a communication sequence view showing the pre-protocol of short protocol facsimile communications when a training sequence cannot be normally received.

Furthermore, as shown in FIG. 8, it is assumed that the receiver side cannot normally receive training signals S, S (bar), PP, TRN. In this case, when it is determined that the training signals cannot be normally received, the tone A signal is transmitted from the receiver side. Therefore, the sender side, which has moved to the communication protocol 43 for setting a parameter, receives the tone A signal. As a result, communication protocol phase 2 is performed again from the transmission of tone B signal.

The above-mentioned embodiment representatively explained the case of modulation signals such as QINFO signal, which is difficult to detect, tone A signal, A (bar) signal, training signal, etc. However, if the other signals cannot be detected, communication phase 2 may be performed again from the transmission of tone B signal.

As mentioned above, according to the modem apparatus of the present invention and the data communication method thereof, the pre-protocol such as exchange of modem parameter can be shortened and such a short protocol can be surely realized at the same time. Therefore, communication time can be shortened and occurrence of communication errors can be prevented to a minimum.

The present invention is not limited to the above-described embodiments, and various variations and modifications may be possible without departing from the scope of the present invention.

This application is based on the Japanese Patent Application No. HEI 10-88646 filed on Apr. 1, 1998, entire content of which is expressly incorporated by reference herein.

What is claimed is:

1. A data communication method comprising:

transmitting a tonal signal, indicating a start of a communication protocol different from a standardized communication protocol, from a sender side;

continuously transmitting a first response signal, indicating acknowledgment of the start of indicated communication protocol, from a receiver side when receiving the tonal signal;

transmitting an information signal, including at least a modem parameter for a telephone number of the receiver side stored in advance, from the sender side when receiving the first response signal; and transmitting a second response signal, indicating a reception acknowledgment of the information signal, in place of said first response signal from the receiver side when receiving the information signal, wherein the sender side repeats transmission of said information signal until receipt of the second response signal from said receiver side.

2. The data communication method according to claim 1, further comprising a step in which said sender side moves to a communication protocol for modem training complying with Recommendation V.34 after repeating the transmission of said information signal predetermined times, wherein when said receiver side receives no information signal, said sender side, which receives said first response signal when transmitting a protocol sync signal PPh complying with Recommendation V.34, returns to the step of transmitting said information signal, again.

3. The data communication method according to claim 2, further comprising a step in which said receiver side moves to said communication protocol for modem training when detecting the end of the transmission of said information signal.

4. The data communication method according to claim 3, further comprising a step in which said receiver side moves to said communication protocol for modem training after said second response signal is transmitted and a predetermined period of time passes, wherein said receiver side transmits said first response signal again after the end of said communication protocol for modem training when said receiver side performs no detection of the end of the transmission of said information signal.

5. The data communication method according to claims 2, wherein said receiver side transmits said first response signal again when no normal end of said communication protocol for modem training is performed.

* * * * *